Feb. 16, 1971 H. SOE 3,562,914

METHOD AND ARRANGEMENT FOR REPRODUCING LINE PATTERNS

Filed Feb. 13, 1969 3 Sheets-Sheet 1

Feb. 16, 1971 H. SOE 3,562,914

METHOD AND ARRANGEMENT FOR REPRODUCING LINE PATTERNS

Filed Feb. 1 , 1969 3 Sheets-Sheet 3

3,562,914
METHOD AND ARRANGEMENT FOR REPRODUCING LINE PATTERNS

Hartvig Soe, Alvsjo, Sweden, assignor to Misomex Aktiebolag, Hagersten, Sweden, a corporation of Sweden Filed Feb. 13, 1969, Ser. No. 799,063
Claims priority, application Sweden, Feb. 15, 1968, 1,984/68
Int. Cl. B43l 13/10
U.S. Cl. 33—23 13 Claims

ABSTRACT OF THE DISCLOSURE

A ruling machine including a scanner which scans each single line of a rectangular pattern and a writer operatively connected to the scanner to reproduce the lines. An electronic device coordinates the scanner and the writer concerning location and length of line information. The scanner and the writer are each movable in two mutually perpendicular directions. The writer includes a device for fixing it step-wise in both directions in exact coincidence with a predetermined imaginary square pattern. Further means lock the writer against movement in one direction during reproduction of a line in the other direction.

Figure 1:
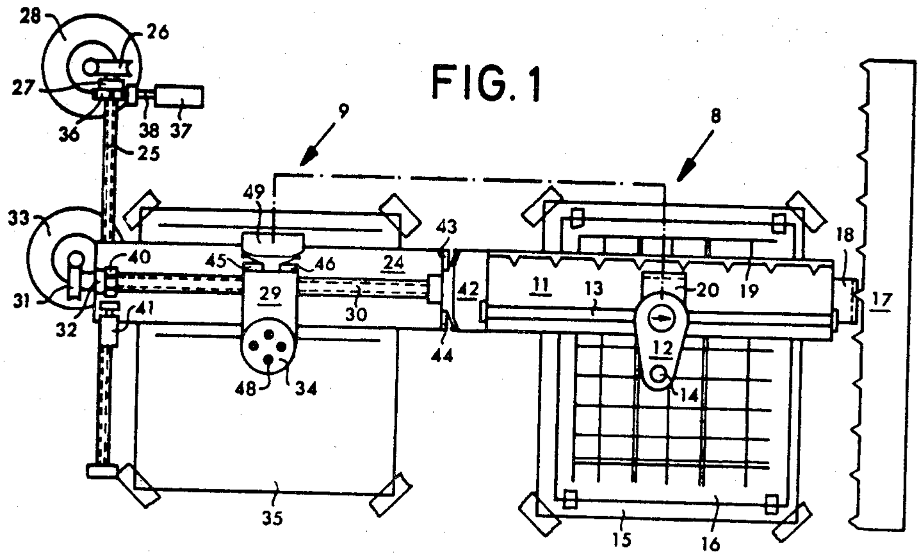

The present invention refers to a method of providing a reproduction which with great accuracy follows a rectangular squared pattern of a predetermined design on basis of any rectangular pattern original or draft.

This invention also refers to a ruling machine for executing said method including a scanner for scanning a pattern original mounted on a draft table and a writer for reproducing the pattern original and an electronic device coordinating the scanner and writer for receiving and treating information coming from the scanner and transferring treated information to the writer, and at which machine the scanner and the writer are individualy movable in two perpendicular directions.

The invention has especial applicability at reproducing complicated line patterns as for instance patterns for tables, statistical line formations and the like, but the method and the arrangement according to the invention is just as well applicable for producing any kind of patterns being composed by short or long lines running in two perpendicular directions.

A very special field of use the invention has become by utilizing same for producing printable line foils which by direct printing to a printing plate provided with light sensible layer, thus without any special treatment, may be used as original in processing the printing plate.

It is obvious to the man skilled in the art that the invention is applicable in many various fields of activity, for instance for the production of original drawings in lead or India ink, the production of scored pattern foils, the production of cross ruled screen patterns, for cutting out masking foils and many other things. For the sake of simplicity the invention will however in the following be described only as regards the production of pattern foils, which by direct printing to a printing plate may serve as originals for such plates.

In making complicated ruling forms one has mainly worked in three various ways. The first method and the most frequently used hitherto has been to compose and print the pattern in the conventional so called letterpress printing. It is however for various reasons extremely difficult to obtain printing forms of accurate size and high quality using this method. Due to the elasticity of the printing form it is utterly difficult to get the printed lines carefully adapted to a rectangular system of coordinates, and it very often happens that longitudinal and transverse lines meet under an angle which is not exactly 90°, and it also very often happens that the longitudinal or transverse lines respectively are not completely parallel or somewhat wavy. Further it is utterly difficult to get the corners formed by the longitudinal and transversal lines carefully connected and normally a non-printed space will occur in the crosspoint between the transverse and longitudinal lines. Sometimes this can be avoided by the transverse and the longitudinal lines respectively being printed in each one printing operation, but this is of course as well complicated as expensive. Added to this the method mentioned is time consuming and expensive.

The second hitherto used method involves the steps that the ruling form manuscript is redrawn in India ink and reproduced or possibly contact printed so that a negative or positive film foil is being obtained which might be used for the production of a printing form. Such a method however makes extremely great demand upon the skill of the person who is redrawing the manuscript, and it has in practice shown that it is very difficult to obtain a perfect printing original in this way. Another difficulty related to as well this method as the previously mentioned method is to get the lines exactly adapted to the standard used for type-writers, computers, accounting machines etc. This is often of great importance since tables, and ruled papers of the kind in question grow more and more frequently used for transcribing the means of typewriters, accounting machines, computing machines and the like, said machines having standardized step movements as well vertically as horizontally. It is obvious that an ever so little fault in measurement may cause great differences in measure when said fault is being repeated several times on a large ruled paper.

The third method which has hitherto been used for the production of ruled forms is to produce a printable film foil by means of photo-composing, but this is very time consuming and circumstantial since the line pattern must firstly be programmed to a perforated tape, said programming already in itself being complicated and demanding upon great skill of the operator. It has also shown that the lines of the film foil produced by photo-composing does not always become completely straight but may become somewhat wavy. Also for other reasons a photocomposing machine is further less suited for this kind of work and it can under no circumstances in an economic way be utilized for the production of originals for line printing forms.

One has also tried to make use of so called coordinatographs or omnigraphs for producing line pattern reproductions. These previously known means have usually been formed with a scanner which is manually forced to follow the lines of the line pattern manuscript and a writer, which will servilely reproduce the movements of the scanner. In order to obtain first class reproducings is hereby firstly a class manuscript required, which in practice means, that the sketch made up for the line pattern must first of all be redrawn. Such a redrawing can without disadvantage be made with India ink, and at that time one has already obtained a usable if not first class pattern original. In this case the method does not offer any advantages. If one the other hand a first class original is presented, which is made up in such a way that it cannot be directly printed or reproduced it may instead be used in an apparatus of the kind mentioned, but also in this case a printable foil can often be made quicker and more economically in a convention protographic way.

The known coordinatographs however require a great skill of the operator, but in spite of such skill of the operator defects in the pattern reproduction usually appear depending on for instance any un-evenness of the ruler which the scanner is forced to follow, the difficulty in completely exactly finding the final point of a line or completely exactly meeting such a point in the formation of the line pattern corners and not least the difficulty in completely exactly meeting the lines of the original pattern with the scanner.

The present invention is intended to overcome the disadvantages mentioned and to propose a method and an arrangement for making reproductions of line patterns according to which method and arrangement reproductions of also slovenly made up line pattern originals can be made quickly and to low costs, the various lines at said reproductions meeting each other completely rectangularly, the lines being completely straight and parallel to each other and the reproductions for the rest presenting an accuracy and an exactitude of measures which has previously not been able to obtain.

The invention will now be described as regards a performance of an arrangement of reproducing line patterns, but it is understood as implied that the invention will not be restricted to the method described or to the arrangement described and shown in the accompanying drawings but that various kinds of modifications may be presented within the frame of the invention.

Figure 3:
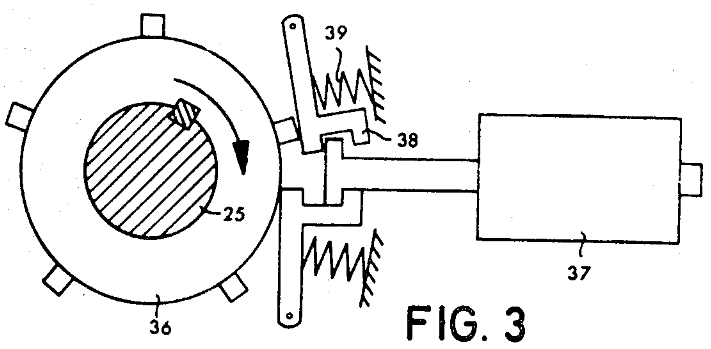
Figure 4:
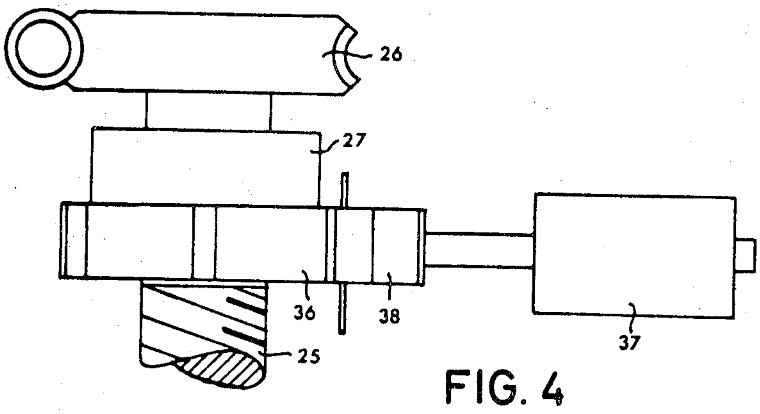
Figure 2:
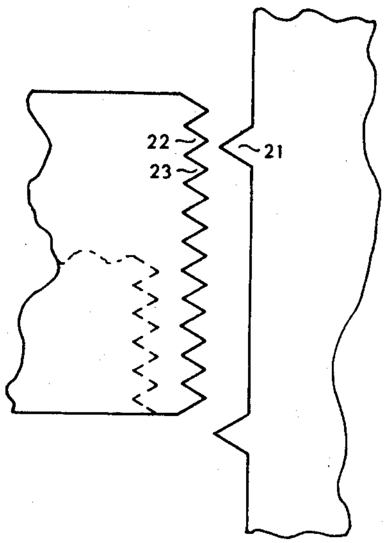
Figure 5:
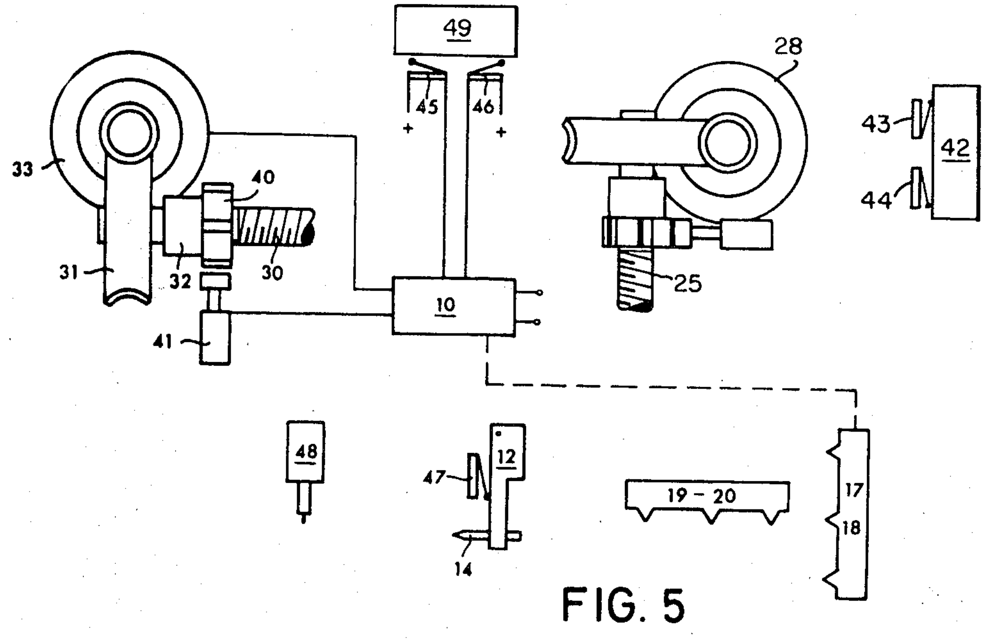
Figure 6:
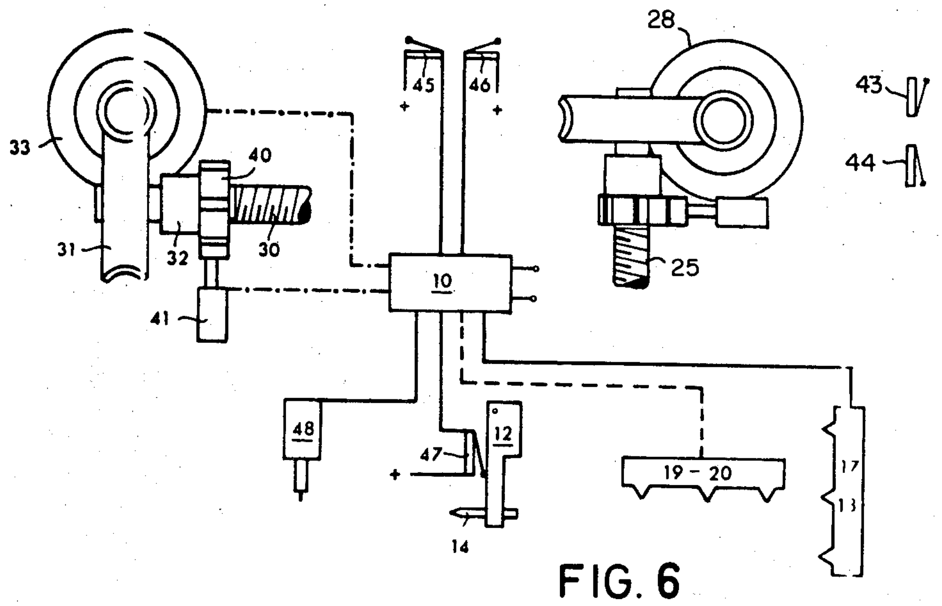
Figure 7:
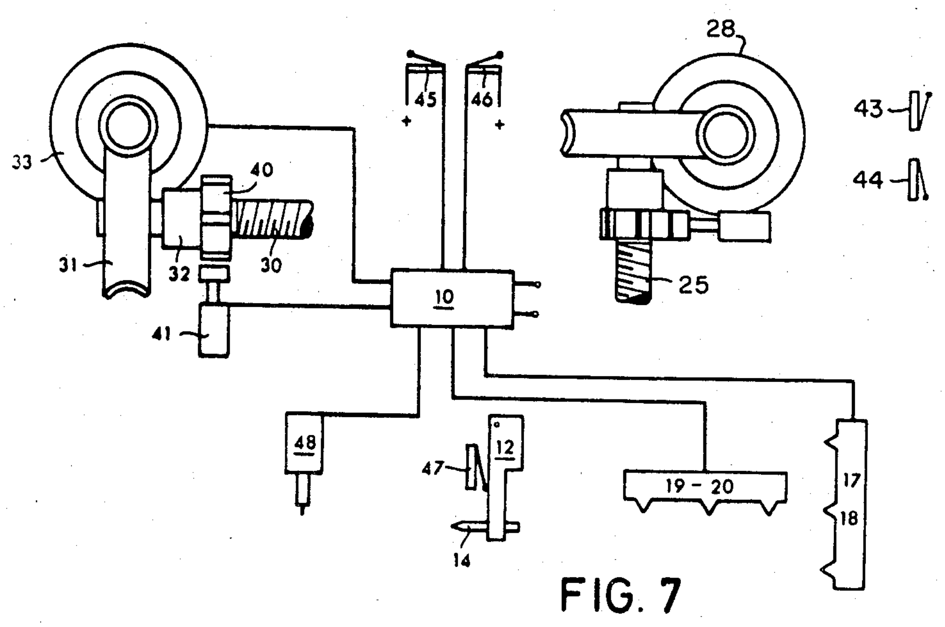

In the drawings FIG. 1 schematically shown a ruling machine according to the invention seen in top view. FIG. 2 shows a part of a horizontal step locking device for the scanner. FIG. 3 shows a detail of a step locking device for the writer, seen in side view, while FIG. 4 shows the detail according to FIG. 3 in top view. The FIGS. 5, 6 and 7 schematically indicate the function of the ruling machine during the production of a horizontal line running from the left to the right, whereby FIG. 5 indicates the stadium of beginning, when the scanner is being moved to the left in order to take the beginning position of the scanning, FIG. 6 shows the state of the arrangement during the horizontal scanning movement of the scanner and FIG. 7 finally shows the moment, when the writer executes the reproducing of the line scanned.

The ruling machine according to the invention includes a scanner in the drawings generally indicated by the reference number 8 and a writer, which is in the drawings generally indicated by the reference number 9. The scanner 8 and the writer 9 are freely movable independently of each other, but for the coordination of said two devices there is an electronic device, in the FIGS. 5, 6 and 7 generally indicated by the reference number 10, the object and function of which will be described below with reference to said figures.

The scanner 8 comprises a parallel movable carriage 11, which is displaceable in one direction, which direction will below for the sake of simplicity be called the vertical direction. On said carriage 11 a slider 12 is displaceably guided by a guide rod 13 or any similar means. The guide rod 13 is mounted perpendicularly to the moving direction of the carriage 11, so that the slider 12 will be displaceable perpendicularly to said moving direction. The slider 12 is in its outer end provided with a scanner pin 14, which may be a ball pencil. The carriage 11 together with the slider 12 rides over a draft table, on to which the pattern draft 16 may be attached. For facilitating the attachment of the pattern draft 16 in such a way on to the draft table, that the lines thereof will be running substantially parallel to the moving directions of the scanner carriage 11 and the scanner slider 12 respectively one can act in such a way, that a cross ruled pattern 15 of a predetermined design is firstly attached to the draft table and the pattern draft 16 is thereupon mounted above the cross-ruled pattern 15 in such a way, that the horizontal and vertical lines thereof will be running parallel to the corresponding lines of the square pattern 15. For facilitating the attachment of the pattern draft onto the square pattern the draft table may be formed as a light table, so that the pattern draft 16 can be fit to the square pattern 15 by a simple translucent of the square pattern and the draft. Instead of using a square pattern the draft table may be provided with two engravings perpendicular to each other and corresponding to the moving directions of the scanner carriage 11 and the scanner slider 12 respectively, and in attaching the pattern draft onto the draft table it is only fit against said positioning lines.

For facilitating a reproduction of the vertical and horizontal lines of the pattern draft 16 there is a vertical locking means engaging the carriage 11 and a horizontal locking means engaging the slider 12. The vertical locking means includes a rack 17 running in the moving direction of the carriage 11 and a cog or a second rack 18 attached to the carriage 11 and adapted to be forced into engagement with said first mentioned rack 17.

The horizontal locking means of the scanner includes like the vertical locking means thereof a rack 19, which is attached to the carriage 11, and which may effectively engage a cog or a rack 20, which is in turn attached to the slider 12.

The racks 17 and 19, which are substantially identical, are formed with teeth, as for instance 21, see FIG. 2, said teeth 21 being spaced but disposed on a line. The racks 18 and 20 are thereagainst formed with continuous saw-toothed shape, where each tooth as for instance 22, 23 have substantially the same form and magnitude as the teeth 21 of the racks 17 and 19.

Instead of forming the horizontal and vertical locking means respectively as two racks engaging each other the fixed racks 17 and 19 respectively can be formed with continuous saw-tooth shape, while the locking means engaging said saw-tooth shaped rack may be formed as one single tooth.

Sometimes it has shown to be necessary or suitable to be able to reproduce a line, which is disposed between two lines of the predetermined square pattern, and in a modified embodiment of the locking mechanism showed in FIG. 2 the movable rack 18 or 20 respectively is for this purpose formed as two alternatively engageable racks, which are mutally displaced a distance corresponding to half the distance between two adjacent teeth as for instance 22, 23. This has been indicated by the broken lines of FIG. 2. If thereby the rack indicated by the continuous lines is normally being utilized the rack marked with the broken lines may in reproducing an intermediate line be brought into engagement with the tooth 21 of FIG. 2 instead of the rack marked with the continuous line, whereby the drawing pencil 14 will be disposed exactly intermediate to adjacent lines of the square pattern.

The pitch between the teeth 21 of the racks 17 and 19 and the teeth 22, 23 of the racks 18 and 20 respectively may be adapted according to the circumstances. The accepted standard of vertical and horizontal steps movement is for instance in computers fractions of an inch, so the pitch between the teeth 21 of the racks 17 and 19 in the described embodiment has been chosen to be exactly one inch. The step displacement in one direction in a computer is 1/10 inch, and consequently the pitch between the teeth 22, 23 of the rack 18 has been made exactly 1/10 inch. Thus the carriage 11 can be displaced ten steps of each 1/10 inch in the vertical direction during engagement between the rack 18 and one and the same tooth 21 of the rack 17. The carriage has thereby moved one inch, and at the next step it starts a new series of engagements with the next adjacent tooth.

The pitch between the teeth of rack 19 are likewise exactly one inch, but in this case the standard of step displacements in computers are 1/8 to 1/12 inch, and consequently the pitch between the teeth of the rack 20 has been chosen to be 1/8 or 1/12 inch. In a modified embodiment of the invention the machine has been provided with two alternatively engageable racks 20, where one has a teeth pitch of 1/8 inch and the second a pitch of 1/12 inch. The vertical or horizontal locking of the scanner may be effected by the racks 17 and 19 being parallelly displaced in towards the racks 18 and 20 respectively but is preferably effected by the racks 18 and 20 respectively being parallelly displaced out towards the racks 17 and 19 respectively.

The writer 9 includes like the scanner 8 a carriage 24, which is parallelly movable in the vertical direction. The vertical displacement of the carriage is effected by means of a threaded shaft 25 via a worm gearing 26 and a clutch 27 being operated by an electric motor 28. The shaft 25 engages a nut mounted to the carriage 24, so that a rotation of the shaft 25 in one direction or the other will effect a vertical displacement up or down of the carriage 24.

A slider 29 is mounted on the carriage 24 and is movable along the carriage in a direction which is exactly perpendicular to the moving direction of the carriage 24. The slider 29 is like the carriage 24 operated by a threaded screw 30 engaging a nut mounted in the slider 29 and via a worm gearing 31 and a clutch 32 being operated by an electric motor 33.

In the free end of the slider 29 extending out of the carriage 24 it is provided with a carrier 34 for a scriber pin, an ink pencil a knife or the like, said tool being intended to execute the actual reproduction work.

Like the carriage 11 of the scanner the carriage 24 of the writer is movable over a table whereupon a blank 35 can be attached, onto which the line pattern is to be drawn.

As will be best seen from FIGS. 3 and 4 a cog wheel 36 is mounted on the shaft 25, and said cog wheel 36 is intended to act as means for locking the carriage 24 against displacement in the vertical direction. The locking is effected by means of a solenoid 37 having an iron core. The core of the solenoid is in its one outer end provided with a bulge engaging two separate locking shoulders 38, which are by means of springs 39 forced inwards against the cog wheel 36. Said locking shoulders 38 are pivotably hinged in their ends turned from each other and are adapted to be in alignment with each other in the position of engagement with some tooth of the cog wheel 36. The locking of the cog wheel 36 may be effected by the forward locking shoulder seen in the rotational direction being brought into engagement with the front edge of a tooth of the cog wheel, while the rearward locking shoulder is lifted by said tooth, whereby the locking in the opposite rotational direction will be effected by the worm gearing being self-locking, or the locking may be effected by the two locking shoulders being brought into engagement with the locking tooth, one engaging the front edge and the other the rear edge thereof. Since the locking shoulders 38 are forced against the cog wheel 36 by the springs 39 said wheel 36 will be locked as long as the solenoid 37 is unactuated, but when the solenoid 37 is actuated the core thereof pulls the locking shoulders 38 outwards, so that the cog wheel 36 is free for rotation. The grooves of the locking shoulders 38 with which the outer bulge of the solenoid core coacts is substantially wider than the width of said bulge, and said excess width should be at least as large as the height of the highest tooth of the cog wheel 36, for when a locking of the cog wheel 36 is to be effected the supply of current to the solenoid 37 is cut off, whereby the springs 39 force the locking shoulders 38 against the cog wheel. This takes place somewhat before the cog wheel 36 has taken the position at which it is to be stopped. The forward locking shoulder seen in the rotational direction of the cog wheel 36 can thereby take its locking position.

The locking shoulders 38 are so mounted, that their mutual distance can be varied as required, for since the cog wheel 36 is intended to rotate alternatively in one direction or the other the inertia or the back lash of the mechanical parts can be abolished if the locking shoulders 38 are being adjusted to such a mutual distance, that a certain play will arise between a locked tooth of the cog wheel 36 and the locking shoulders 38. By adjusting said play in relation to the other masses and the rotational speed of the rotating parts it is possible to obtain a very high accuracy in the adjustment of the writing unit as regards the predetermined square pattern.

The screw shaft 25 is driven by a clutch 27, for instance a friction clutch, which at a quick arising locking of the screw 25 will drag and in such a way will make it possible for the motor 28 and any parts belonging thereto to stop softly.

The means for executing the horizontal locking of the slider 29 is formed in exactly the same way as the vertical locking means described above and includes a cog wheel 40, which is fixed to the screw 30 and the teeth of which are engaging two locking shoulders which may be actuated by a solenoid 41. Also here a release of the cog wheel 40 will be effected by an actuation of the solenoid 41, whereupon the locking shoulders are turned out from said cog wheel 40.

In order that the predetermined steps of locking will be obtained the screw 25 and the screw 30 are each formed with a thread lead of exactly ½ inch, and the number of teeth on the cog wheel 36 are five, and a rotation of the shaft 25 an angle corresponding to the angle between two adjacent teeth will consequently effect a displacement of the carriage 24 exactly $\frac{1}{10}$ inch, i.e. the predetermined standard step displacement. In order to obtain a displacement of ⅛ or $\frac{1}{12}$ inch in the horizontal direction the cog wheel 40 is alternatively formed with four or six teeth, and in the modified embodiment of the invention mentioned above two cog wheels are mounted on the shaft 30, one having four and the other having six teeth, said cog wheels being adapted to be alternatively brought into engagement with each one locking mechanism.

The connection between the scanner 8 and the writer 9 may be established in many various ways, but in the preferred embodiment of the invention said connection is maintained by mechanical means in the form of cam disks activating microswitches which by the activation thereof will transmit information of the displacements of the scanner and the writer respectively to the electronic device. For establishing a connection in the vertical direction the carriage 11 is in the end thereof located close to the carriage 24 of the writer formed with a cam disk 42 which will influence two microswitches 43 and 44 in the displacement of the carriage 11 upwards or downwards respectively. The connection in the horizontal direction between the scanner slider 12 and the writer slider 29 is also maintained by a cam 49, which by mechanical means is connected to the slider 12, and which at a transverse displacement will influence two microswitches 45 and 46.

Further the scanner slider 12 is so connected to the writer slider 29, that the scanner pencil 14 will in depressing same influence a microswitch 47 (see FIG. 5), so that a signal is transmitted to the electronic device, whereby said electronic device will study and treat said signal and effect a displacement of the writer carriage 24 and the writer slider 29 to a position corresponding to the point, where the scanner pencil 14 is located and in connection therewith effect an ejection downwards of a drawing pencil, for instance 48 mounted in the carrier 34 of the writer slider 29 so as to contact the blank 35, onto which the reproduction is intended to be drawn. The basic function will now be described in connection with the schematic FIGS. 5, 6 and 7. The reproduction of the pattern draft is intended to take place by manual actuation of the scanner slider 12 in both the horizontal and the vertical direction. The scanner pencil in the scanner slider 12 can be moved transversely and/or upwards and downwards as long as said pencil 14 is not depressed. In the position shown in FIG. 5 the operator is just looking for the point of the pattern draft, where the scanner pencil 14 is to start its scanning operation. In FIG. 5 however only a horizontal displacement of the scanner pencil has been shown, but it is understood as implied that a vertical displacement of the pencil 14 can take place instead thereof or at the same time as said horizontal displacement. Before the scanning of the point of beginning the scanning begins the cam 49 is so located, that the two microswitches 45 and 46 of the writer slider are influenced thereof. When the scanner pencil 14 is moved in the horizontal direction the cam 49 is firstly disengaged with the rear word microswitch seen in the moving direction of the slider 29, whereby a signal is being transferred to the electronic device 10, which will store said signal for coming demands. When the cam 49 has then passed the forward one of the two microswitches and disengages also this one a second signal will be transferred to the electronic device 10, said signal being added to the first mentioned signal, and the electronic device has thereby received an information both about the scanner slider having been moved out of its position of still standing and about the direction of said movement.

If a vertical displacement is effected at the same time as said horizontal displacement the cam disk 42 will influence the two contacts 43 and 44 and give the electronic device as an information concerning a corresponding displacement of the scanner carriage 11.

If now a line is intended to be drawn in for instance the horizontal direction the machine is adjusted for drawing horizontal lines, which for instance can take place by turning a circuit switch in FIG. 1 indicated by an arrow so that the arrow will be horizontally directed.

When now the electronic device 10 has received the information that the scanner pencil 14 has been moved for instance in the horizontal direction as well as the information about the direction of displacement said electronic device 10 will effect electric current to be emitted both to the horizontal locking solenoid 41, which will thereby release the screw 30 for rotation, and to the horizontal driving motor 33, which will thereby force the screw 30 to rotate in such a direction, that the writer slider 29 will be moved in a direction corresponding to the moving direction of the scanner slider 12. This displacement takes place with some delay as regards the movement of the scanner slider, so that the cam 49 will run a distance in advance of the microswitch 46, however only on the assumption that the scanner slider 12 is moved at a higher speed than the displacement speed of the writer slider 29. When the scanner pencil 14 has reached the crosspoint between a vertical and a horizontal line of the predetermined square pattern, where the reproduction is to begin the pencil is stopped. The writer slider 29 is thereby still moving and will remain so until the two microswitches 45 and 46 are again influenced by the cam 49, whereby a signal is emitted from each one of the microswitches 45 and 46 to the electronic device with the result, that the supply of electric current to the solenoid 41 is cut off immediately and the supply of electric current to the driving motor 33 is cut off with some delay. At the same time as the supply of current to the solenoid 41 is cut off this will again take its original expanded locking position, so that the locking shoulders 38 may in the above described manner engage the first passing tooth of the cog wheel 40 which depends on the delayed stopping of the motor 33 still moving. The screw 30 is thereby stopped immediately and in such a position, that the writer pencil 48 will be located exactly above the crosspoint between a horizontal and a vertical line of the predetermined square pattern, corresponding to the location of the scanner pencil 14. Because of the friction clutch 32 mounted between the cog wheel 40 and the drive unit 31, 33 the drive motor 33 can together with its belonging parts be stopped softly and without hurting actuation of the horizontal displacement means of the writer slider 29.

If the portion now taken by the scanner pencil 14 does not completely correspond to the point, where the reproduction is intended to begin the pencil 14 is once again moved until it takes its intended position, whereby the reproducing mechanism will in the above described manner be moved in correspondence to this scanner displacement.

Now the actual reproduction can begin, and this case is schematically shown in FIG. 6. This is done so that the scanner pencil 14 of the scanner slider 12 is pressed down into contact with the pattern draft 16 located under the carriage 11. Thereby the microswitch 47 is influenced, so that a signal is transferred to the electronic device 10 to the effect, that the vertical locking means 17, 18 of the scanner 8 as well as the horizontal locking means 19, 20 are switched on and the scanner pencil 14 is locked against any displacement in as well the vertical as the horizontal direction. The writer slider 29, which hight still be in movement continues its movement until the writer pencil 48 has taken its above mentioned starting position for the reproduction, when the current is cut off to both the solenoid 41 and the driving motor 33, whereby the writer pencil 48 is immediately stopped in a correct position. At the same time as the writer pencil 48 is thus stopped the electronic device will effect an ejection downwards of the writer pencil 48 into contact with the reproduction blank 35 located under said pencil. Not until the writer pencil 48 has taken this writing position will one of the two locking means of the scanner 48 be released, so that the scanner pencil 14 can be moved. If the arrangement is adjusted for horizontal lining the horizontal locking means 19, 20 is thereby released, whereupon the reproduction can take place.

Since the teeth 21, 22, 23 of the cooperating racks 17, 18 and 19, 20 respectively are conically point formed a vertical or horizontal false positioning that might occur will automatically be corrected, so that the pencil at depressing into contact with the pattern draft will always be correctly positioned in the cross point between a vertical and a horizontal line of the predetermined square pattern as is intimated in FIG. 2.

The scanning drawing simply takes place by moving a scanner pencil 14 still depressed a distance corresponding to the length of the line to be reproduced. The vertical and the horizontal moving means of the writer are during this scanning operation locked against movement and will remain so until the scanner pencil 14 after having finished its scanning drawing is raised from its contact with the pattern draft.

If it should be found after having executed a scanning drawing of a line of the pattern draft 16 that the scanner pencil 14 is not located exactly on the point where the line is to be ended it is possible to correct this false displacement without letting the writer 9 have any information thereabout by moving the scanner pencil 14 into correct position without moving the pencil from the pattern draft. One can even return to the point of starting the scanning drawing and at this point raise the pencil 14, and no reproduction onto the reproduction blank 35 will thereby take place.

At the beginning of the scanning drawing the two microswitches 45 and 46 of the writer slider 29 was influenced, and the electronic device 10 thereby received the two pieces of information mentioned above, which were only accumulated in the electronic device for coming requirements. The electronic device 10 has thus received three pieces of information, viz. that a reproduction is to take place, that the scanning drawing has started and the direction of moving the scanner pencil.

When the scanner pencil 14 after the scanning drawing has been executed is allowed to be raised the following occurs, as indicated in FIG. 7. In letting up the scanner pencil 14 a further signal is transferred to the electronic device 10, which has as the result, that also the horizontal locking means 10, 20 of the scanner 8 is switched on so as to lock the pencil against displacement also in the horizontal direction. The vertical locking means 17 and 18 of the scanner 8 keeps its locked position, and the writer pencil 48 of the writer 9 keeps its position of being expanded downwards against the reproduction blank 35. Now the electronic device 10 will transmit electric current to as well the solenoid 41 as the horizontal drive motor 33, which effects the writer to begin to move in the direction in which the scanning took place. The writer slider 29 moves until the two microswitches 45 and 46 are once more influenced by the cam 49 as described above, whereby the writer slider 29 is brought to stop in an exact position corresponding to the point, where the scanner pencil 14 was raised after the scanning operation. At the same time as the writer pencil 48 stops the supply of current to same is also cut off, and the pencil is raised from its contact with the reproduction blank 35. Thereafter also the vertical and the horizontal locking means 17–20 of the scanner 9 are released. A line has now been reproduced, and the next reproduction operation can begin. If it is now intended to reproduce a line parallel to the line just reproduced one will only get to the point of beginning of the next line, whereby exactly the same functions will enter as those described above. It is to be noticed, that the scanning and thereby also the reproduction can take place in any direction and must not necessarily take place for instance from the left to the right and downwards respectively, even if this is usually the most natural.

If on the contrary a reproduction is to take place in a direction perpendicular to the direction of the line just reproduced the machine is adjusted for ruling in the other direction by turning the wheel of the scanner slider 12 marked with an arrow, whereupon a reproduction can take place in an analogous manner.

The ruling machine can also be used for forming continuous chases of different magnitudes and designs. If it is for instance wished to reproduce a chase starting with the upper left corner thereof a lining is executed to the left, whereby the upper horizontal line of the chase is reproduced. Thereafter the machine is adjusted for vertical lining, and the scanner pencil is forced downwards to follow the right vertical line of the case. Now the apparatus is once again adjusted now for horizontal lining, and the scanner pencil is forced to the left thereby following the lower horizontal line of the chase, and finally the apparatus is adjusted for vertical lining, and the left, vertical line of the chase is reproduced in the direction upwards.

This possibility is of especial importance in forming wide chases, where it is possible to have the writer pencil 48 to scratch chases having rounded outer corners or sharp outer corners depending on where the centre of the writer point is disposed both in relation to the predetermined square pattern and also in relation to the pencil itself. If the centre of the pencil point corresponds to the centre of the pencil 48 itself forming a chase with the method described above will give rounded outer corners. If on the contrary the turning centre of the writer pencil 48 is disposed at one edge thereof it is possible to alternatively form chases having round or sharp corners depending on if the turning centre of the pencil 48 is forced to follow the outer edges or the inner edges respectively of the chase. The reproduction of chases having rounded corners will take place in the same way as described above. In the reproduction of chases having sharp corners, which will thus take place with the turning centre of the scratch pencil 48 running along the outer edges of the chase one will for instance starting with the upper left corner of the chase adjust the apparatus for horizontal lining and a lining to the right of the upper horizontal line of the chase is executed. Thereafter the scratched pencil 48 is turned about its turning centre in the clockwise direction, and a reproduction lining vertically downwards of the right, vertical line of the chase takes place. Correspondingly and in turning the scratch pencil 48 a quarter of a turn in clockwise direction for each line the two last lines of the chase are reproduced. In this way it is possible to form a chase disposed immediate outside the square pattern lines or immediately inside said square pattern lines or a chase disposed centrally over said square pattern lines.

In the described embodiment of the invention the scanner slider and the scanner pencil are preferably manually actuated, but it is obvious to the man skilled in the art, that the invention involves possibilities of arranging said means actuatable by mechanical, electrical or other means. It is further obvious to the man skilled in the art, that by exchanging the horizontal and the vertical locking means it is possible to provide any step displacements, and that the machine elements described above and shown in the drawings may suitably be replaced by equivalent means without departure of the scope of invention.

What I claim is:

1. A ruling machine comprising a scanner for scanning each single line of a substantially rectangular pattern draft attached to a draft table, and a writer operatively connected to the scanner for reproducing lines corresponding to lines of the pattern draft onto a reproduction blank, an electronic means operatively coordinating the scanner and the writer for receiving information coming from the scanner concerning the location of the length of the scanned line and, in response to said information, causing the writer to execute said reproduction of the lines, the scanner and the writer each being movable in two directions perpendicular to each other, and the writer being provided with means for stepwise fixed locking in both directions of its writing tool in exact coincidence with a predetermined, imaginary square pattern, and said electronic means including means to positively lock the writer against movement in one direction during a reproduction of a line onto the reproduction blank in the other direction perpendicular to said first mentioned direction.

2. A ruling machine according to claim 1, wherein the scanner is provided with means for fixed locking thereof in correspondence with the predetermined square pattern in one moving direction thereof during the reproduction drawing of the pattern draft in the other moving direction.

3. A ruling machine according to claim 1, wherein each one of the scanner and the writer is formed as a carriage movable in one direction and thereon having a slider being displaceable in a direction perpendicular to the moving direction of the carriage.

4. A ruling machine according to claim 3, wherein the carriage and the slider of the scanner are manually displaceable, while the carriage and the slider of the writer are displaceable by means of a screw axle engaging the carriage and the slider respectively, said screw axles each being connected to an electric motor by worm gearings.

5. A ruling machine according to claim 4, wherein the locking means for the writer comprises at least one cog wheel fixed mounted to each one of the screw axles and the teeth of which are adapted to releasably engage a shoulder fixed mounted to the ruling machine.

6. A ruling machine according to claim 5, wherein the fixed shoulder of the ruling machine comprises two separate and spaced spring actuated locking shoulders which may be brought out of engagement with the cog wheel by means of a solenoid.

7. A ruling machine according to claim 5, wherein a friction clutch is disposed between each cog wheel and its drive motor for making it possible to stop the motor softly when the screw axles have been locked by their locking means.

8. A ruling machine according to claim 2, wherein the locking means for the scanner for each moving direction thereof comprises two coacting racks, one of which is displaceable to and from engagement with the other one.

9. A ruling machine according to claim 5, wherein the coacting locking racks of the scanner are formed with such a pitch between their teeth, that a stepwise displacement of the scanner in correspondence with the predetermined imaginary square pattern is possible, and the locking screw axles of the writer are formed with such a thread lead and the cog wheels mounted on said screw axles are provided with so many teeth in relation to the thread lead of the axles, that the distance between two adjacent teeth corresponds to a step displacement of the writer exactly one step of the predetermined imaginary square pattern.

10. A ruling machine according to claim 1, wherein the connection between the scanner and the writer for each lining direction includes a cam which will, in being displaced, influence two indicating means which thus transfer signals to the electronic device, whereby said electronic device receives the signals to operate the machine.

11. A ruling machine according to claim 1, including a scanner pencil mounted on the scanner which can manually be brought into contact with the pattern draft disposed under the scanner and wherein a switch is actuated and a signal is transferred to the electronic device, whereby said electronic device brings a writer pencil mounted on the writer into contact with a reproduction blank located under said writer when the writer has come into correct position.

12. A ruling machine according to claim 1, wherein both the scanner and the writer are formed for various long step displacements in the two lining directions.

13. A ruling machine according to claim 5 including two alternatively engageable racks having different pitch between their teeth and mounted in the scanner slider, and two likewise alternatively engageable cog wheels having different numbers of teeth and fixed mounted to the drive screw of the writer slider.

References Cited

UNITED STATES PATENTS

| | | | |
|---|---|---|---|
| 1,471,869 | 10/1923 | Turner ___________ | 33—25(A) |
| 2,553,600 | 5/1951 | Mattare __________ | 33—19(A) |
| 3,024,396 | 3/1962 | Peckjian ___________ | 33—1(M) |

HARRY N. HAROIAN, Primary Examiner